(12) United States Patent
Joten

(10) Patent No.: US 7,589,811 B2
(45) Date of Patent: Sep. 15, 2009

(54) LIQUID CRYSTAL DISPLAY DEVICE

(75) Inventor: Kazuhiro Joten, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/946,505

(22) Filed: Nov. 28, 2007

(65) Prior Publication Data
US 2008/0143929 A1    Jun. 19, 2008

(30) Foreign Application Priority Data
Dec. 19, 2006   (JP)   ............... 2006-341766
Oct. 3, 2007    (JP)   ............... 2007-260181

(51) Int. Cl.
G02F 1/1335    (2006.01)

(52) U.S. Cl. ............... 349/119; 349/96; 349/118

(58) Field of Classification Search ......... 349/117–119, 349/96
See application file for complete search history.

(56) References Cited

U.S. PATENT DOCUMENTS

| | | | |
|---|---|---|---|
| 6,977,700 B2 * | 12/2005 | Uesaka et al. | ............... 349/114 |
| 7,072,009 B2 * | 7/2006 | Joten | ............... 349/96 |
| 2004/0233362 A1 * | 11/2004 | Kashima | ............... 349/117 |
| 2006/0232733 A1 * | 10/2006 | Shibazaki | ............... 349/117 |
| 2007/0126960 A1 | 6/2007 | Joten | |
| 2007/0165165 A1 | 7/2007 | Joten | |

FOREIGN PATENT DOCUMENTS

| | | |
|---|---|---|
| JP | 2005-99236 | 4/2005 |
| JP | 2005-181451 | 7/2005 |
| KR | 2006-43168 | 5/2009 |

* cited by examiner

*Primary Examiner*—Thoi V Duong
(74) *Attorney, Agent, or Firm*—Oblon, Spivak, McClelland, Maier & Neustadt, P.C.

(57) ABSTRACT

A liquid crystal display device includes a first optical element which is provided on one of outer surfaces of a liquid crystal display panel including homogeneously aligned liquid crystal molecules and includes a first polarizer plate, a first retardation plate in which nematic liquid crystal molecules are solidified in a state in which the nematic liquid crystal molecules are hybrid-aligned in a liquid crystal state along a normal direction, and a second retardation plate, and a second optical element which is composed of a second polarizer plate.

6 Claims, 15 Drawing Sheets

※ Major viewing angle direction of panel is 45°
※ n - C = negative C plate (nx = ny > nz)
※ NB = negative biaxial (nx > ny > nz)

CR = 10 : 1
Up-and-down / right-and-left = 160° /160°

Up-and-down / right-and-left = 140° / 145°
(CR = 10 : 1)

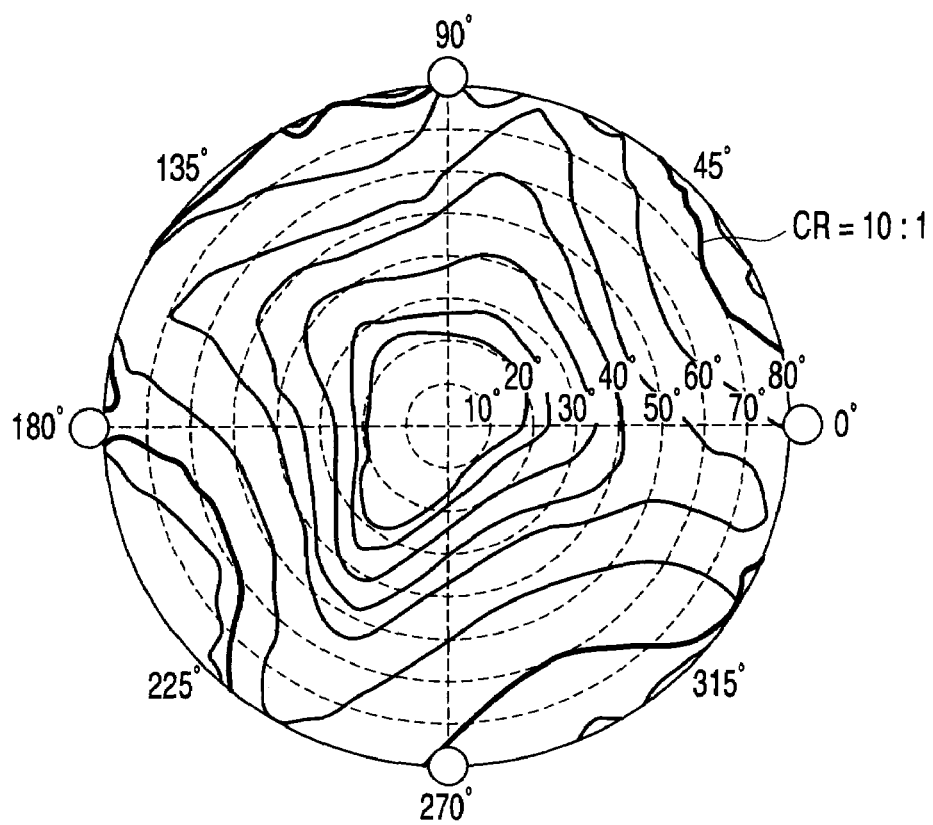
F I G. 1 1 A
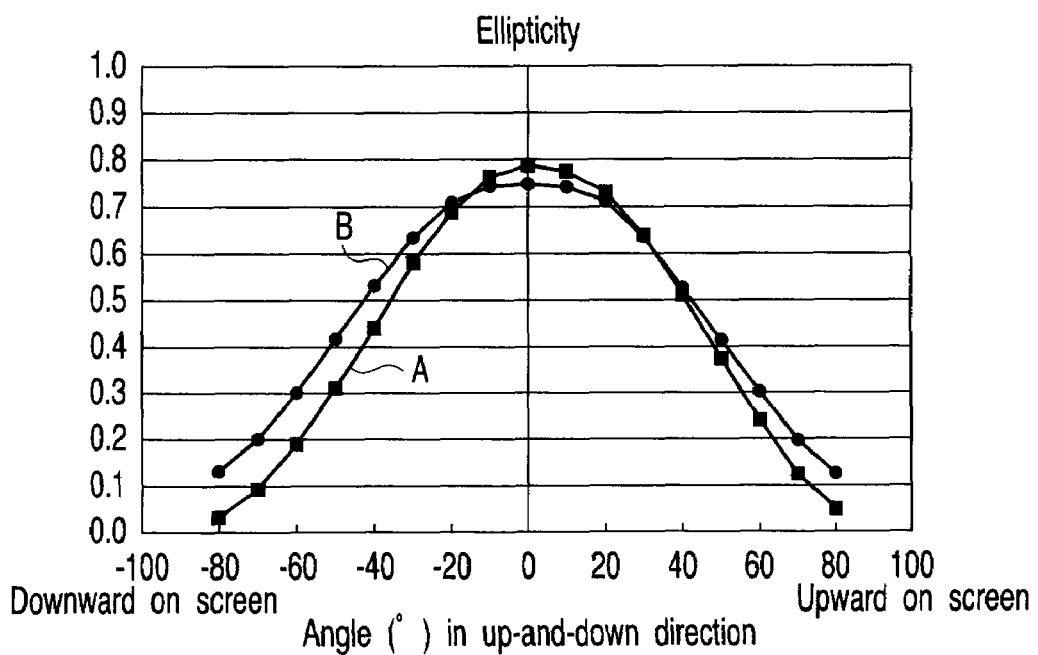
F I G. 1 1 B

LIQUID CRYSTAL DISPLAY DEVICE

CROSS-REFERENCE TO RELATED APPLICATIONS

This application is based upon and claims the benefit of priority from prior Japanese Patent Applications No. 2006-341766, filed Dec. 19, 2006; and No. 2007-260181, filed Oct. 3, 2007, the entire contents of both of which are incorporated herein by reference.

BACKGROUND OF THE INVENTION

1. Field of the Invention

The present invention relates generally to a liquid crystal display device, and more particularly to a transmissive liquid crystal display device having a liquid crystal layer which includes homogeneously aligned liquid crystal molecules.

2. Description of the Related Art

As regards a vertically aligned (VA) mode liquid crystal display device which has excellent display characteristics in a front viewing direction, like a twisted nematic (TN) mode liquid crystal display device, there has been proposed a technique of realizing wide viewing angle characteristics by applying a retardation film for compensating a viewing angle (see, e.g. Jpn. Pat. Appln. KOKAI Publication No. 2005-099236).

In addition, there has been proposed a technique of fabricating a biaxial birefringence film which is applicable to a liquid crystal display device such as a super twisted nematic (STN) mode liquid crystal display device (see, e.g. Jpn. Pat. Appln. KOKAI Publication No. 2005-181451).

In recent years, with respect to liquid crystal display devices which are configured such that a liquid crystal layer including homogeneously aligned liquid crystal molecules is held between a pair of substrates, there has been a demand for improvement of display quality, for example, an improvement in contrast and an increase in viewing angle. On the other hand, there has been a demand for reduction in thickness of the entire device and reduction in cost.

BRIEF SUMMARY OF THE INVENTION

The present invention has been made in consideration of the above-described problems, and the object of the invention is to provide a liquid crystal display device with good display quality, which can realize reduction in thickness and cost.

According to an aspect of the present invention, there is provided a liquid crystal display device comprising: a liquid crystal display panel in which a liquid crystal layer including homogeneously aligned liquid crystal molecules is held between a first substrate and a second substrate which are disposed to be opposed to each other; a first optical element which is provided on one of outer surfaces of the liquid crystal display panel and includes a first polarizer plate, and a first retardation plate and a second retardation plate which are disposed between the first polarizer plate and the liquid crystal display panel; and a second optical element which includes a second polarizer plate provided on the other outer surface of the liquid crystal display panel, wherein the first retardation plate is a retardation plate which imparts a predetermined retardation to light of a predetermined wavelength and in which nematic liquid crystal molecules are solidified in a state in which the nematic liquid crystal molecules are hybrid-aligned along a normal direction.

The present invention can provide a liquid crystal display device with good display quality, which can realize reduction in thickness and cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11A is a characteristic diagram showing a measurement result of the viewing angle dependency of the contrast ratio in Comparative Example 2 in a case where a negative C-plate is disposed between the second optical element and the liquid crystal layer;

FIG. 11B is a characteristic diagram showing matching between a variation in ellipticity in the up-and-down direction of the polarization state of backlight, which has passed through the first optical element and the liquid crystal layer, and a variation in ellipticity in the up-and-down direction of the polarization state of ambient light, which has passed through the second optical element, in Comparative Example 2 in the case where the negative C-plate is disposed between the second optical element and the liquid crystal layer;

DETAILED DESCRIPTION OF THE INVENTION

A liquid crystal display device according to an embodiment of the present invention will now be described with reference to the accompanying drawings. In this embodiment, a liquid crystal display device, which includes a transmissive display part that displays an image by selectively passing backlight, is exemplified.

Figure 1:
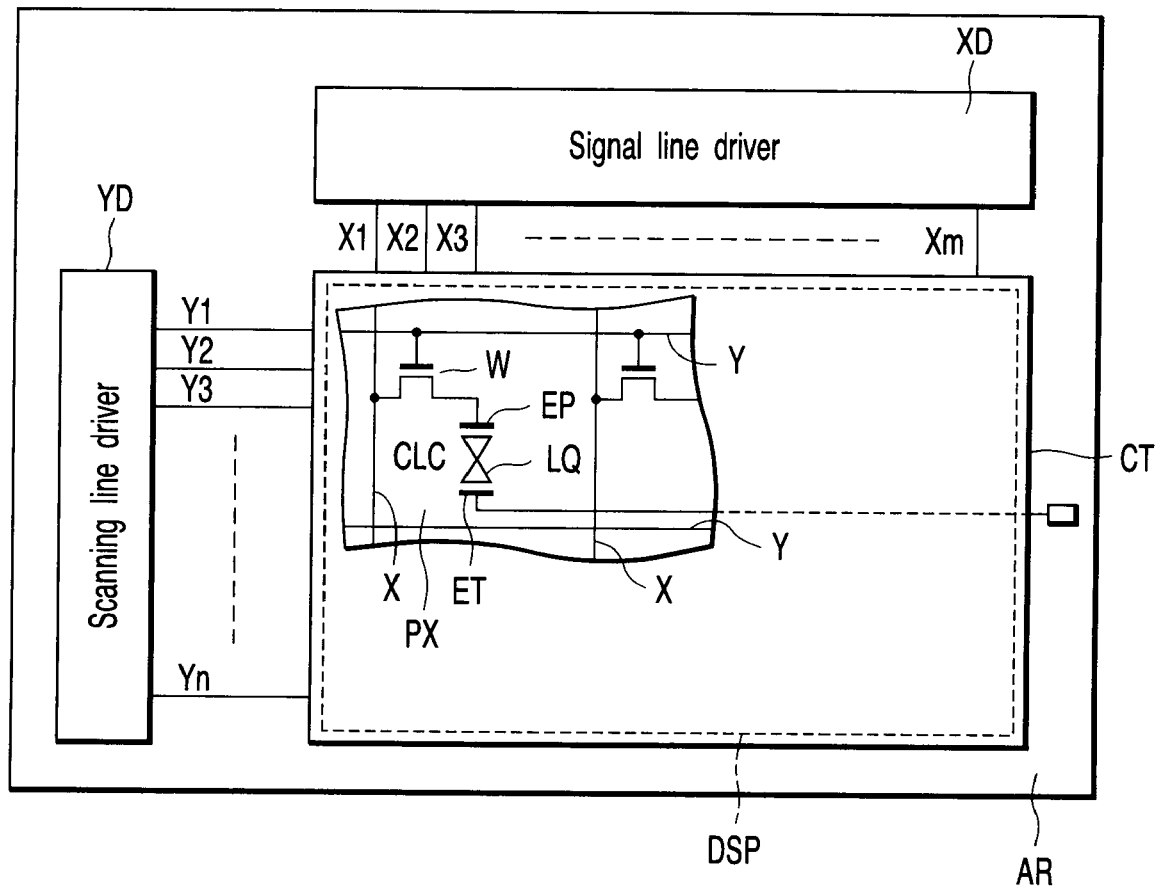
FIG. 1 schematically shows the structure of a liquid crystal display device according to an embodiment of the present invention.
Figure 2:
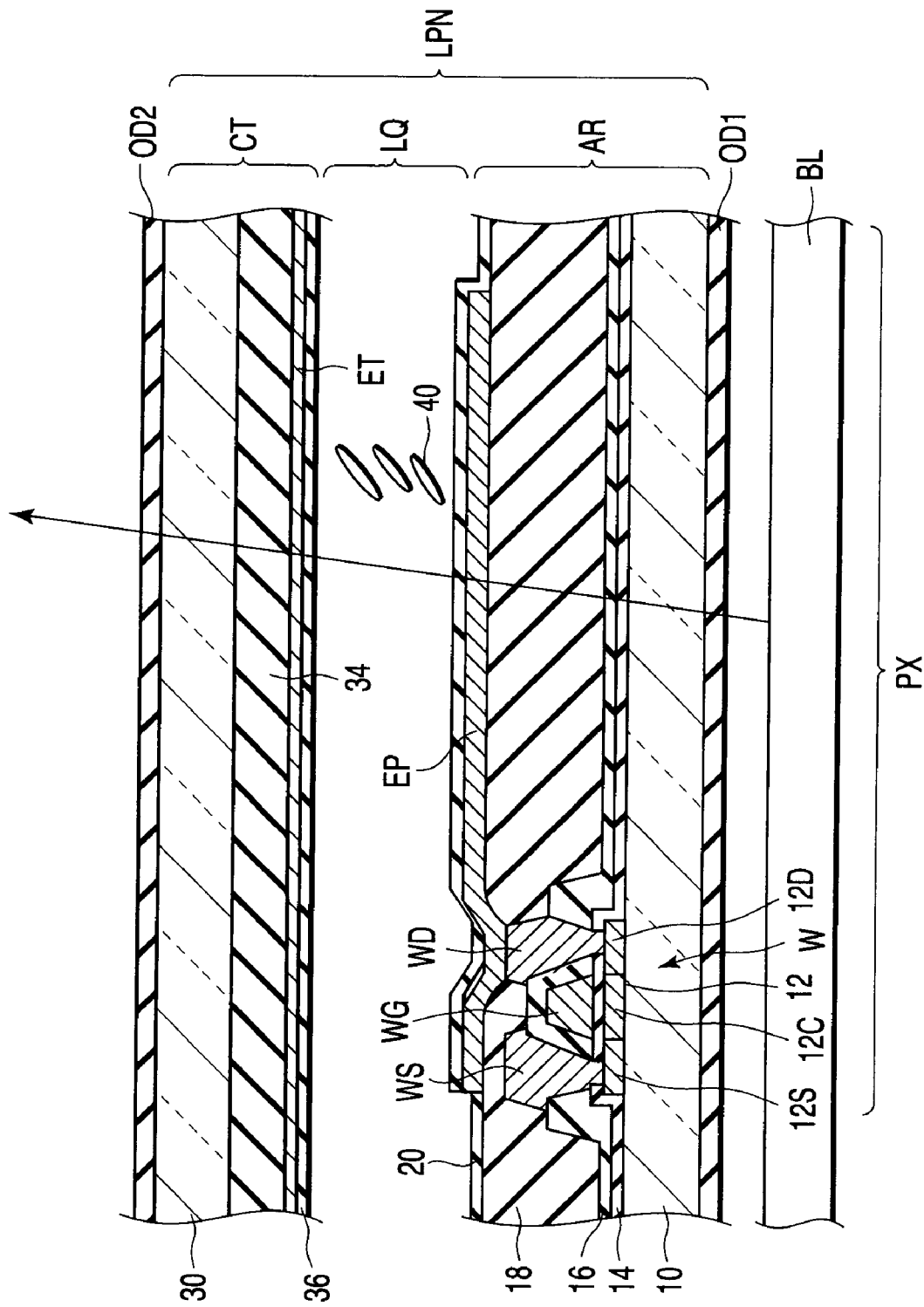
FIG. 2 schematically shows the cross-sectional structure of the liquid crystal display device shown in FIG. 1.

As is shown in FIG. 1 and FIG. 2, the liquid crystal display device is an active-matrix-type color liquid crystal device, which includes a transmissive liquid crystal display panel LPN. The liquid crystal display panel LPN is configured to include an array substrate (first substrate) AR, a counter-substrate (second substrate) CT which is disposed to be opposed to the array substrate AR, and a liquid crystal layer LQ which is held between the array substrate AR and the counter-substrate CT.

In addition, the liquid crystal display device includes a first optical element OD1 which is provided on one of outer surfaces of the liquid crystal display panel LPN (i.e. an outer surface of the array substrate AR, which is opposed to the other outer surface thereof facing the liquid crystal layer LQ), and a second optical element OD2 which is provided on the other outer surface of the liquid crystal display panel LPN (i.e. an outer surface of the counter-substrate CT, which is opposed to the other outer surface thereof facing the liquid crystal layer LQ). Further, the liquid crystal display device includes a backlight unit BL which illuminates the liquid crystal display panel LPN from the first optical element OD1 side.

The liquid crystal display panel LPN includes a plurality of display regions DSP that display an image. The display region DSP is composed of a plurality of pixels PX which are arrayed in a matrix of m×n.

The array substrate AR is formed by using an insulating substrate 10 having light transmissivity, such as a glass plate or a quartz plate. Specifically, the array substrate AR includes, in the display region DSP, an (m×n) number of pixel electrodes EP which are disposed in the respective pixels, an n-number of scanning lines Y (Y1 to Yn) which are formed in the row direction of the pixel electrodes EP, an m-number of signal lines X (X1 to Xm) which are formed in the column direction of the pixel electrodes EP, and an (m×n) number of switching elements W which are disposed in regions including intersections between the scanning lines Y and signal lines X in the respective pixels PX.

Further, in a driving circuit region DCT in the vicinity of the display region DSP, the array substrate AR includes at least a part of a scanning line driver YD which is connected to the n-number of scanning lines Y and at least a part of a signal line driver XD which is connected to the m-number of signal lines X. The scanning line driver YD successively supplies scanning signals (driving signals) to the n-number of scanning lines Y on the basis of the control by a controller CNT. The signal line driver XD supplies, under the control of the controller CNT, video signals (driving signals) to the m-number of signal lines X at a timing when the switching elements W of each row are turned on by the scanning signal. Thereby, the pixel electrodes EP in each row are set at pixel potentials corresponding to the video signals that are supplied via the associated switching elements W.

Each of the switching elements W is, for instance, an n-channel thin-film transistor, and includes a semiconductor layer 12 which is disposed on the insulating substrate 10. The semiconductor layer 12 can be formed by using, e.g. polysilicon or amorphous silicon. In this embodiment, the semiconductor layer 12 is formed of polysilicon. The semiconductor layer 12 includes a source region 12S and a drain region 12D, between which a channel region 12C is interposed. The semiconductor layer 12 is covered with a gate insulation film 14.

A gate electrode WG of the switching element W is connected to one associated scanning line Y (or formed integral with the scanning line Y). The gate electrode WG and the scanning line Y are disposed on the gate insulation film 14. The gate electrode WG and scanning line Y are covered with an interlayer insulation film 16.

A source electrode WS and a drain electrode WD of the switching element W are disposed on the interlayer insulation film 16 on both sides of the gate electrode WG. The source electrode WS is connected to one associated signal line X (or formed integral with the signal line X) and is put in contact with the source region 12S of the semiconductor layer 12. The drain electrode WD is connected to one associated pixel electrode EP (or formed integral with the pixel electrode EP) and is put in contact with the drain region 12D of the semiconductor layer 12. The source electrode WS, drain electrode WD and signal line X are covered with an organic insulation film 18.

The pixel electrode EP is disposed on the organic insulation film 18 and is electrically connected to the drain electrode WD via a contact hole formed in the organic insulation film 18. The pixel electrode EP is formed of a light-transmissive electrically conductive material such as indium tin oxide (ITO). The pixel electrode EP, which is disposed in each associated pixel PX, is covered with an alignment film 20.

On the other hand, the counter-substrate CT is formed by using a light-transmissive insulating substrate 30 such as a glass plate or a quartz plate. Specifically, the counter-substrate CT includes a counter-electrode ET in the display region DSP. The counter-electrode ET is disposed to be opposed to the pixel electrodes EP in association with the plural pixels PX. The counter-electrode ET is formed of a light-transmissive electrically conductive material such as ITO. The counter-electrode ET is covered with an alignment film 36.

The liquid crystal display device of the color display type includes a color filter layer 34 which is provided on the inner surface of the liquid crystal display panel LPN in association with each pixel. In the example shown in FIG. 2, the color filter layer 34 is provided on the counter-substrate CT. The color filter layer 34 is formed of color resins of a plurality of colors, for example, the three primary colors of red, blue and green. The red color resin, blue color resin and green color resin are disposed in association with a red pixel, a blue pixel and a green pixel, respectively. The color filter layer 34 may be disposed on the array substrate AR side.

The respective pixels PX are partitioned by a black matrix (not shown). The black matrix is disposed to be opposed to wiring lines, such as scanning lines Y, signal lines X and switching elements W, which are provided on the array substrate AR.

When the counter-substrate CT and the above-described array substrate AR are disposed such that their alignment films 20 and 36 are opposed, a predetermined gap is provided by spacers (e.g. columnar spacers formed of resin material) not shown, which are disposed between the alignment films 20 and 36. The liquid crystal layer LQ is composed of a liquid crystal composition including liquid crystal molecules 40, which is sealed in the gap between the alignment film 20 of the array substrate AR and the alignment film 36 of the counter-substrate CT. In this embodiment, the liquid crystal layer LQ includes liquid crystal molecules 40 with a twist angle of 0 deg. (homogeneous alignment).

Figure 3:
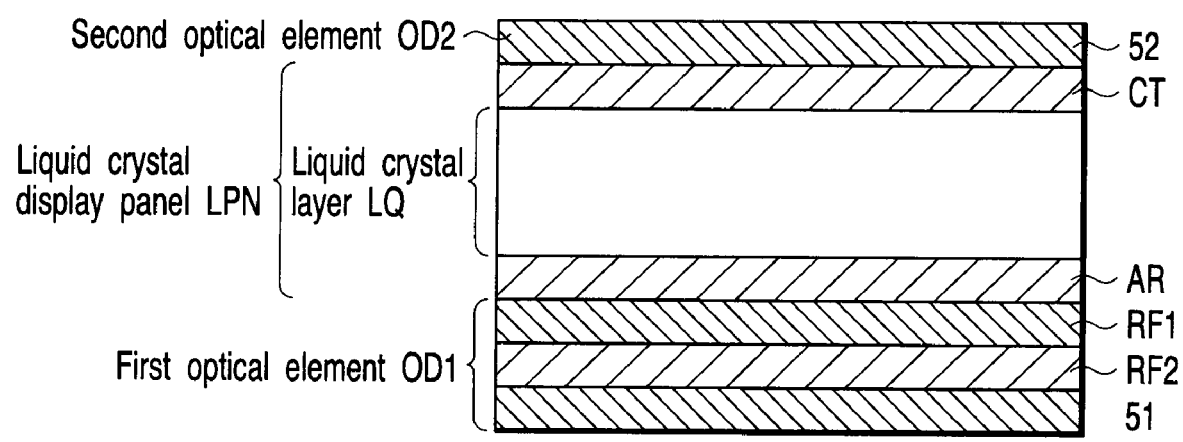
FIG. 3 schematically shows the structures of a first optical element and a second optical element which are applicable to the liquid crystal display device shown in FIG. 2.

In the liquid crystal display device according to the embodiment of the invention, as shown in FIG. 3, the first optical element OD1 and second optical element OD2 control the polarization state of light that passes therethrough. Specifically, the first optical element OD1 controls the polarization state of light passing through the first optical element OD1 so that light in a polarization state of elliptical polarization, which is as close as possible to linear polarization, may be incident on the liquid crystal layer LQ. Thus, the polarization state of backlight, which is incident on the first optical element OD1, is converted to a predetermined polarization state while the backlight is passing through the first optical element OD1. Then, the backlight, which emerges from the first optical element OD1, enters the liquid crystal layer LQ while keeping the predetermined polarization state. When a voltage for black display (black display voltage) is applied to the liquid crystal layer LQ, the polarization state of light incident on the liquid crystal display panel LPN is affected by the phase difference of the liquid crystal layer LQ and is changed to a substantially linear polarization state.

The second optical element OD2 controls the polarization state of light passing through the second optical element OD2 so that light in a polarization state of linear polarization (or elliptical polarization which is as close as possible to linear polarization) may be incident on the liquid crystal layer LQ. Thus, the polarization state of light, which is incident on the second optical element OD2, is converted to a predetermined polarization state, i.e. a linear polarization state, while the light is passing through the second optical element OD2.

In other words, the polarization state of the light, which has passed through the first optical element OD1 and liquid crystal display panel LPN, is a substantially linear polarization with ellipticity (=minor-axis-directional amplitude Es/major-axis-directional amplitude Ep) which is substantially equal to the ellipticity of the light that has passed through the second optical element OD2. The substantially linear polarization, in this context, is a polarization state with an ellipticity of 0.1 or less, preferably 0.02 or less. With this structure, the contrast in the normal direction of the liquid crystal display panel LPN can be improved, and the viewing angle can be increased.

The respective structural components will be described in greater detail.

The first optical element OD1 is configured to include a first polarizer plate 51, and a first retardation plate RF1 and a second retardation plate RF2 which are disposed between the first polarizer plate 51 and the liquid crystal display panel LPN. In the example shown in FIG. 3, the first retardation plate RF1 is disposed between the first polarizer plate 51 and the liquid crystal display panel LPN (array substrate AR). The second retardation plate RF2 is disposed between the first polarizer plate 51 and the first retardation plate RF1.

The second optical element OD2 is composed of a second polarizer plate 52.

Each of the first polarizer plate 51 and second polarizer plate 52, which are employed in this embodiment, has an absorption axis and a transmission axis which are perpendicular to each other in a plane that is perpendicular to the direction of travel of light. Each of these polarizer plates extracts light having an oscillation plane in one direction parallel to the transmission axis, i.e. light in a linear polarization state, from the light having oscillation planes in random directions.

Figure 4A:
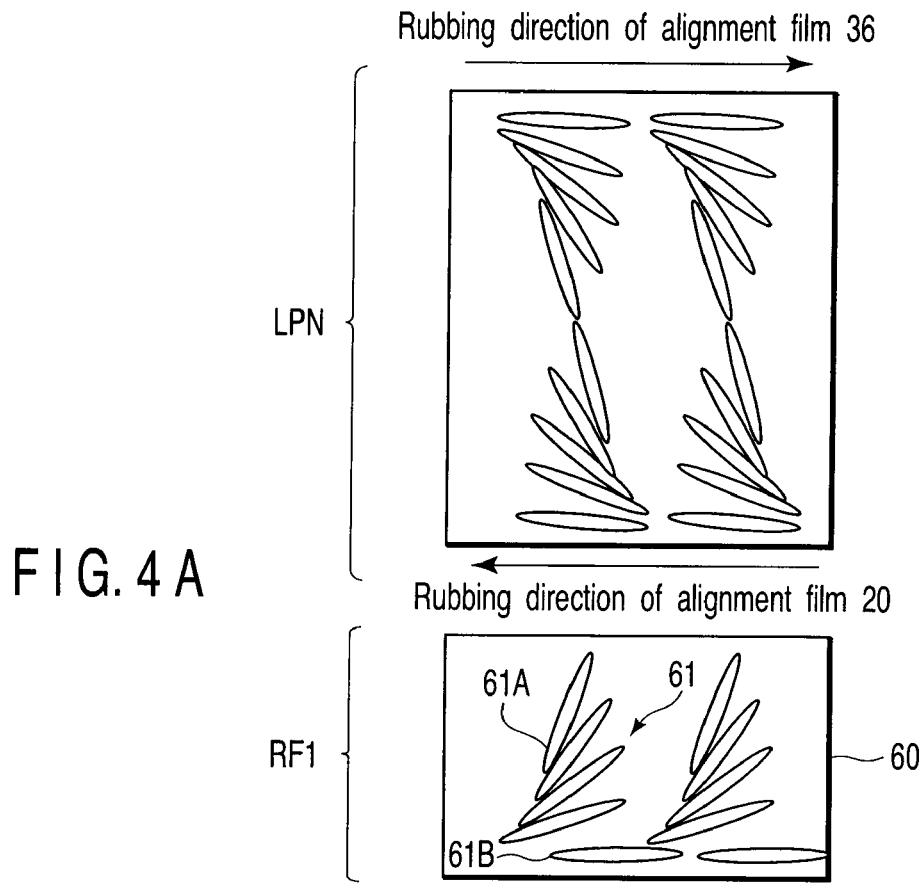
FIG. 4A is a view for explaining the relationship between the alignment of liquid crystal molecules of a liquid crystal display panel and the alignment of liquid crystal molecules of a first retardation plate at a time when a voltage is applied.

The first retardation plate RF1, which is used here, is a retardation plate having optical anisotropy. As shown in FIG. 4A, the first retardation plate RF1 includes a liquid crystal film layer 60 in which nematic liquid crystal molecules 61 having an optically positive uniaxial refractive index anisotropy are solidified in a state in which the liquid crystal molecules are hybrid-aligned along the normal direction (i.e. the thickness direction of the retardation plate) in the liquid crystal phase.

In this liquid crystal film layer 60, for example, in the vicinity of the interface on the array substrate AR side, liquid crystal molecules 61A are aligned with a relatively large tilt angle to the interface (i.e. liquid crystal molecules 61A are aligned substantially perpendicular to the interface). On the other hand, in the vicinity of the interface on the second retardation plate RF2 side, liquid crystal molecules 61B are aligned with a relatively small tilt angle to the interface (i.e. liquid crystal molecules 61B are aligned substantially parallel to the interface). In short, in the liquid crystal display panel LPN, the alignment direction of liquid crystal molecules on the array substrate AR side at the time of voltage application is different by 180° from the hybrid direction of liquid crystal molecules included in the first retardation plate RF1. An NH film (manufactured by Nippon Oil Corporation) is applicable as the first retardation plate RF1. This liquid crystal film has a function of optically compensating the retardation of the liquid crystal layer LQ, which varies, depending on the viewing angle, due to the alignment of liquid crystal molecules 40 included in the liquid crystal layer LQ, and this liquid crystal film corresponds to a retardation plate having a viewing angle increasing function.

As regards the liquid crystal layer LQ, in which the alignment of the liquid crystal molecules 40 having refractive index anisotropy varies depending on the application voltage, and the retardation plate having refractive index anisotropy, when birefringence is discussed, the slow axis corresponds to an axis in which a refractive index is relatively large, and the fast axis corresponds to an axis in which a refractive index is relatively small. It is assumed that the slow axis agrees with an oscillation plane of extraordinary rays, and that the fast axis agrees with an oscillation plane of ordinary rays. When the refractive index of ordinary rays and the refractive index of extraordinary rays are no and ne, respectively, and the thickness of the liquid crystal layer LQ extending in the direction of travel of rays is d, the retardation of the liquid crystal layer LQ is defined by $\Delta n \cdot d$ (nm)=(ne·d−no·d) (i.e. $\Delta n$=ne−no). In addition, as regards the retardation plate, major refractive indices corresponding to three mutually perpendicular axes are used. If the major refractive indices corresponding to mutually perpendicular axes in the plane of the retardation plate are nx and ny, the major refractive index corresponding to the axis in the normal direction (i.e. the thickness direction of the retardation plate) is nz, and the thickness of the retardation plate is d, the frontal retardation of the retardation plate is defined by R=(nx−ny)·d.

Each of the first retardation plate RF1 and second retardation plate RF2, which are included in the first optical element OD1, has a slow axis and a fast axis which are perpendicular to each other, and has a predetermined frontal retardation.

Specifically, the first retardation plate RF1 has, in addition to the above-described viewing angle increasing function, a function of the retardation plate which imparts a predetermined retardation (i.e. retardation of $\lambda/m$, where $\lambda$ is a wavelength and m is a positive number) between light components of a predetermined wavelength (e.g. 550 nm), which pass through the slow axis that is the director of the liquid crystal molecules 61 and the fast axis that is perpendicular to the slow axis.

In addition, the second retardation plate RF2 is a retardation plate which imparts a predetermined retardation (i.e. retardation of $\lambda/n$, where $\lambda$ is a wavelength and n is a positive number) between light components of a predetermined wavelength (e.g. 550 nm), which pass through the fast axis and the slow axis. ZEONOR (manufactured by OPTES) and ARTON (manufactured by JSR) are applicable to the second retardation plate RF2.

In the first optical element OD1, the respective structural components are arranged such that the absorption axis A1 of the first polarizer plate 51, the in-plane slow axis D1 of the first retardation plate RF1 and the in-plane slow axis D2 of the second retardation plate RF2 have a predetermined relationship of angles. Specifically, the second retardation plate RF2 is disposed on the first polarizer plate 51 such that the slow axis D2 of the second retardation plate RF2 is at about 45° to the absorption axis A1 of the first polarizer plate 51. The first retardation plate RF1 is disposed on the second retardation plate RF2 such that the slow axis D1 of the first retardation plate RF1 is at about 90° to the slow axis D2 of the second retardation plate RF2. In the case where the first optical element OD1 is disposed on the liquid crystal display panel LPN, the first optical element OD1 is disposed such that the slow axis D1 of the first retardation plate RF1 having the viewing angle increasing function is substantially parallel to the director (the rubbing direction of the alignment film 20 on the array substrate AR side) of the liquid crystal molecules 40 of the liquid crystal layer LQ and that the hybrid-alignment direction of the liquid crystal molecules 61 in the first retardation plate RF1 is opposite to the rubbing direction of the alignment film 20 on the array substrate AR side.

In addition, in the second optical element OD2, the second polarizer plate 52 is disposed such that the absorption axis A2 thereof is perpendicular (about 90°) to the absorption axis A1 of the first polarizer plate 51.

By virtue of this structure, the first optical element OD1 has the function of conversion to elliptically polarized light with a predetermined ellipticity or to substantially linearly polarized light, and the function of increasing the viewing angle. In addition, the second optical element OD2 has the function of conversion to substantially linearly polarized light with an ellipticity that is substantially equal to the ellipticity of the light that has passed through the first optical element OD1 and the liquid crystal display panel LPN.

In particular, the birefringence material, of which the retardation plate is formed, has such characteristics that the major refractive index of the birefringence material depends on the wavelength of light. Accordingly, the retardation R of the retardation plate depends on the wavelength of passing light. Thus, as described above, by making use of the first optical element OD1 in which at least two kinds of retardation plates are combined, the wavelength dependency of the retardation R can be relaxed, and a predetermined retardation can be imparted and a desired polarization state can be obtained in the range of all wavelengths used for color display.

Specifically, backlight emerging from the first optical element OD1 is converted to substantially linearly polarized light and made incident on the liquid crystal layer LQ. It is assumed that the major axis direction of the substantially linearly polarized light is parallel to an X axis. In the liquid crystal layer LQ, a retardation of $\lambda/2$ is imparted to the substantially linearly polarized light that has entered the liquid crystal layer LQ at a time of application of no voltage (or at a time of application of low voltage). Thereby, the light emerging from the liquid crystal layer LQ is converted to linearly polarized light that is perpendicular to the substantially linearly polarized light entering the liquid crystal layer. In short, the plane of oscillation of this linearly polarized light is parallel to a Y axis that is perpendicular to the X axis. Accordingly, by applying the second polarizer plate 52 having the absorption axis parallel to the X axis to the second optical element OD2, the linearly polarized light emerging from the liquid crystal layer LQ can be passed with a high transmittance ("white display") without making use of some other retardation plate.

On the other hand, in the liquid crystal layer LQ, substantially zero retardation is imparted to the substantially linearly polarized light which is incident on the liquid crystal layer LQ at a time of application of a voltage (or at a time of application of a high voltage). Thereby, the light emerging from the liquid crystal layer LQ maintains a polarization state which is equal to the polarization state of the substantially linearly polarized light that is yet to enter the liquid crystal layer. In short, the plane of oscillation of this substantially linearly polarized light is parallel to the X axis. Accordingly, by applying the second polarizer plate 52 having the absorption axis parallel to the X axis to the second optical element OD2, the linearly polarized light emerging from the liquid crystal layer LQ can be absorbed with a high absorption ratio ("black display") without making use of some other retardation plate. As described above, since the second optical element is composed of only the second polarizer plate 52 without use of a retardation plate, the reduction in thickness and cost can be realized and good optical characteristics can be obtained.

Next, as regards the method for obtaining better optical characteristics, in particular, the optical compensation at the time of black display, discussions are made on the relationship between the frontal retardation R(RF1) of the first retardation plate RF1 and the frontal retardation R(RF2) of the second retardation plate RF2 in the first optical element OD1 and the residual retardation R(LQ) of the liquid crystal layer LQ at the time of black display.

The residual retardation R(LQ) of the liquid crystal layer LQ is now explained. In the case where a voltage for black display ("black display voltage") is applied to the liquid crystal layer LQ, liquid crystal molecules 40, which are located in a middle portion ("mid-plane") away from the interface of the substrate, are aligned such that their major axis direction is substantially parallel to the direction of electric field. Thus, the frontal retardation of the mid-plane of the liquid crystal layer LQ is regarded as being substantially zero (nm). However, liquid crystal molecules 40, which are aligned near the interface of the substrate, are affected by the alignment restricting force ("anchoring") of the interface, these liquid crystal molecules 40 have low responsivity to voltage, and these liquid crystal molecules 40 maintain the substantially initial alignment state. Accordingly, the frontal retardation in the vicinity of the interface of the substrate of the liquid crystal layer LQ does not become zero (nm). Consequently, even if a sufficiently high black display voltage is applied to the liquid crystal layer LQ in order to effect black display, the frontal retardation remains in the liquid crystal layer LQ due to the influence of the anchoring at the interface of the substrate. This is generally called "residual retardation".

In the present embodiment, (1) each of the liquid crystal layer LQ, the first retardation plate RF1 and the second retardation plate RF2, which are used, has a positive retardation, (2) the director of the liquid crystal molecules 40 in the liquid crystal layer LQ is set to be substantially parallel to the slow axis D1 of the first retardation plate RF1 and (3) the slow axis D1 of the first retardation plate RF1 is set at about 90° to the slow axis D2 of the second retardation plate RF2. Accordingly, the total retardation R(total) of the frontal retardation R(RF1) of the first retardation plate RF1 and the frontal retardation R(RF2) of the second retardation plate RF2 of the first optical element OD1 and the residual retardation R(LQ) of the liquid crystal layer LQ is expressed by R(total)=R(LQ)+R(RF1)−R(RF2).

In this equation, the respective retardations are set so that the R(total) becomes zero, that is, R(LQ)+R(RF1)=R(RF2). Thereby, optical compensation between the first optical element OD1 and the liquid crystal layer LQ can be realized. Specifically, in the present embodiment, the polarization state of the backlight is not converted to the substantially linear polarization by the first optical element OD1 alone. In consideration of the residual retardation of the liquid crystal layer LQ, the polarization state of the light emerging from the liquid crystal display panel LPN is converted to the substantially linear polarization (ellipticity<0.1).

To be more specific, the sum of the residual retardation of the liquid crystal layer LQ and the frontal retardation of the first retardation plate RF1 is set to be substantially equal to the frontal retardation of the second retardation plate RF2. Thereby, backlight from the backlight unit BL can be converted to light in a polarization state that is as close as possible to linear polarization, after the backlight has passed through the first optical element OD1 and the liquid crystal layer LQ at the time of black display. Therefore, even in the case of black display as well as the above-described case of white display, the polarization state of the light emerging from the first optical element OD1 and liquid crystal layer LQ can be made close to the linear polarization with substantially zero ellipticity, and thus good optical characteristics can be obtained simply by applying the second polarizer plate 52 to the second optical element OD2.

Next, the arrangement of the first optical element OD1 and second optical element OD2 on the liquid crystal display panel LPN is discussed.

Figure 4B:
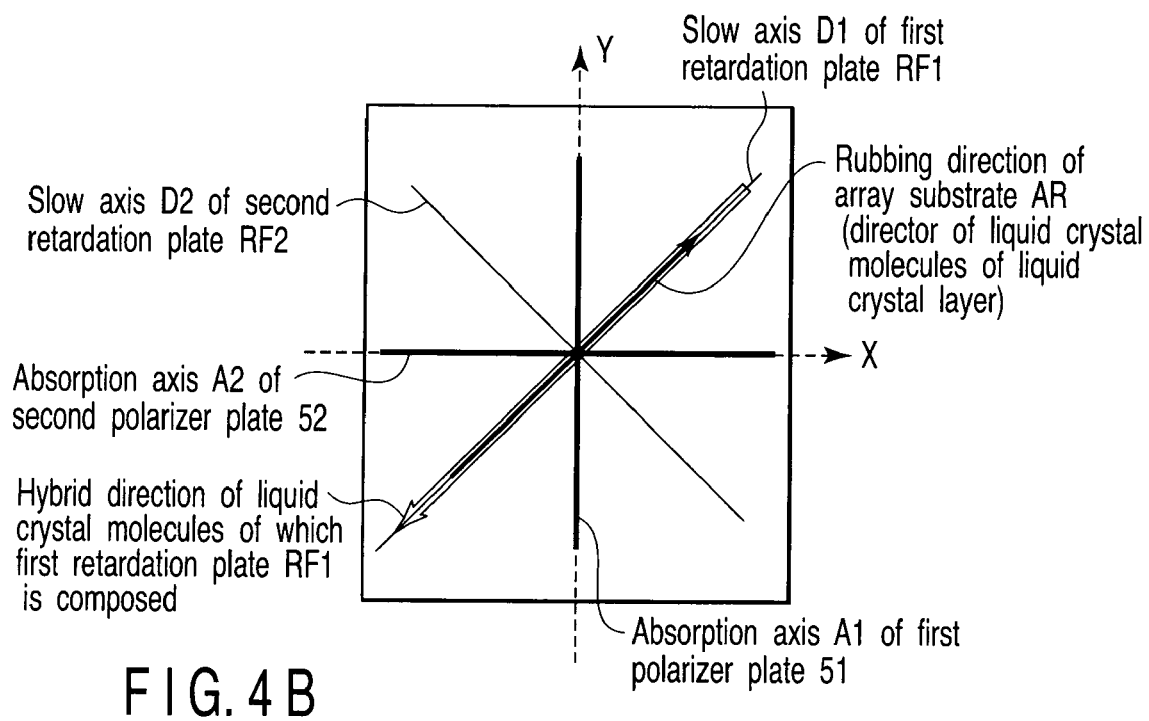
FIG. 4B is a view for describing the azimuth directions of slow axes of retardation plates and the azimuth directions of absorption axes of polarizer plates shown in FIG. 3.

The description is given with reference to FIG. 4B in which the liquid crystal display device is observed from the counter-substrate CT side. For the purpose of convenience, an X axis and a Y axis, which are perpendicular to each other, are defined in a plane parallel to the major surface of the array substrate AR (or counter-substrate CT), and the normal direction to this plate is defined as a Z axis. The phrase "in a plane" means "in a plane defined by the X axis and Y axis". For example, the X axis corresponds to the horizontal direction of the screen and the Y axis corresponds to the vertical direction of the screen. It is assumed that a direction (0° azimuth) on the positive (+) side of the X axis corresponds to the right side of the screen, and a direction (180° azimuth) on the negative (−) side of the X axis corresponds to the left side of the screen. Further, it is assumed that a direction (90° azimuth) on the positive (+) side of the Y axis corresponds to the upper side of the screen, and a direction (270° azimuth) on the negative (−) side of the Y axis corresponds to the lower side of the screen.

In the liquid crystal display panel LPN, the rubbing direction of the alignment film 20 on the array substrate AR side is set at 45° to the X axis.

The arrangement of the first optical element OD1 on the liquid crystal display panel LPN is set on the basis of the rubbing direction of the alignment film 20. Specifically, the first retardation plate RF1 is disposed such that the slow axis D1 thereof is directed at 45°-225° azimuth in parallel to the rubbing direction of the alignment film 20. At this time, the hybrid direction of the liquid crystal molecules included in the first retardation plate RF1 is at 225° azimuth in a direction opposite to the rubbing direction of the alignment film 20. The slow axis D2 of the second retardation plate RF2 is disposed substantially perpendicular to the slow axis D1 of the first retardation plate RF1 (i.e. 135° azimuth). In addition, the first polarizer plate 51 is disposed such that its absorption axis A1 is at about 45° to the slow axis D1 of the first retardation plate RF1 and to the slow axis D2 of the second retardation plate RF2, for example, at 90°-270° azimuth.

On the other hand, the arrangement of the second optical element OD2 on the liquid crystal display panel LPN is set on the basis of, for example, the azimuth direction of the substantially linearly polarized light emerging from the liquid crystal layer LQ at the time of black display (the azimuth direction parallel to the X axis in this case). Specifically, in the second optical element OD2, the second polarizer plate 52 is disposed such that its absorption axis A2 is substantially parallel to the direction of the major axis of the ellipsoid of the polarization state (substantially linear polarization) of the light emerging from the first optical element OD1 and liquid crystal layer LQ. In short, the second polarizer plate 52 may be disposed such that its absorption axis A2 is at 0°-180° azimuth.

Figure 5:
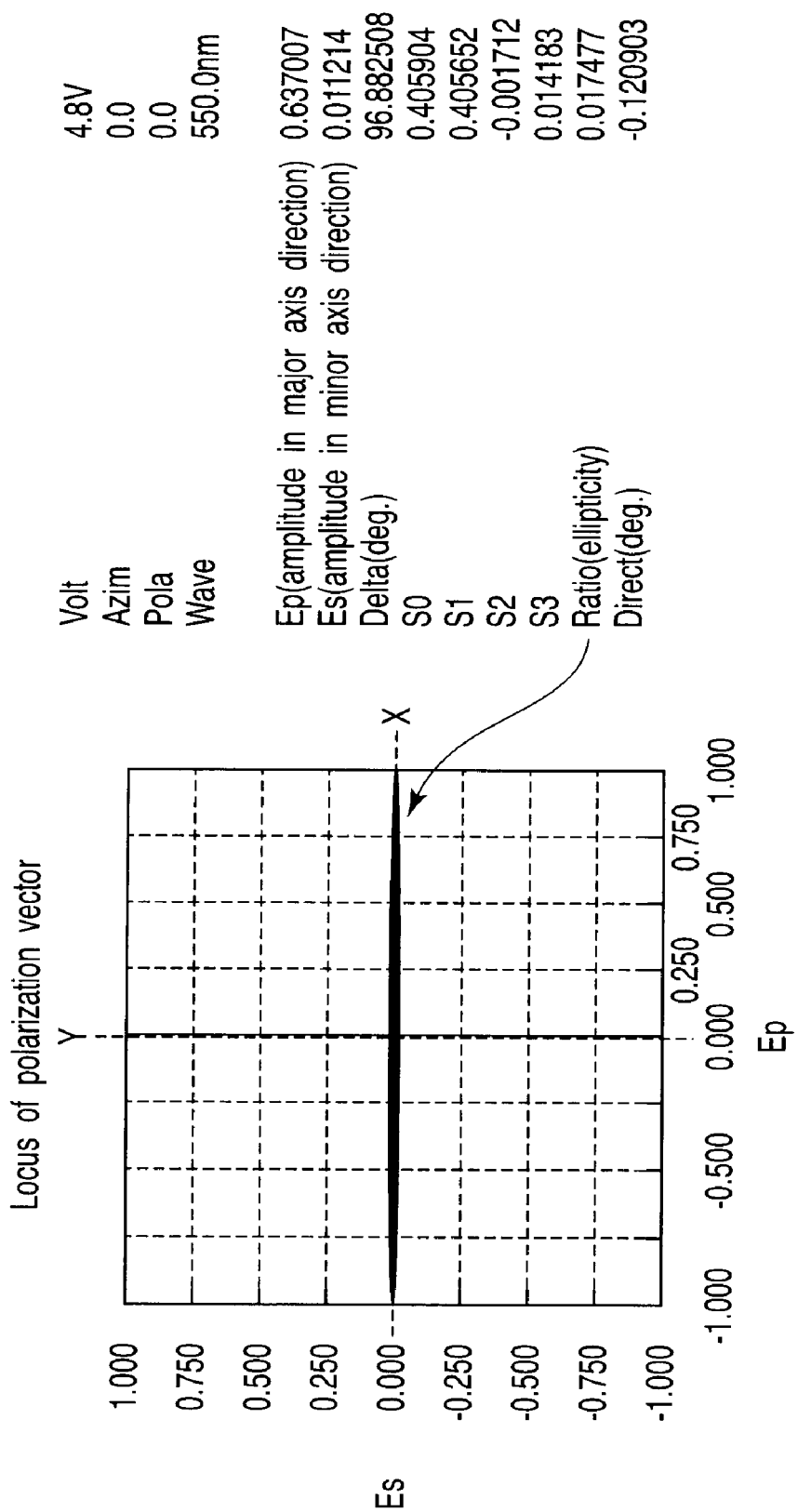
FIG. 5 is a characteristic diagram showing a polarization state after backlight has passed through the first optical element and liquid crystal layer in the liquid crystal display device according to the present embodiment.

FIG. 5 shows the polarization state of backlight emerging from the first optical element OD1 and liquid crystal layer LQ having the above-described structure, when a black display voltage (e.g. 4.8 V) was applied to the liquid crystal layer LQ. In the black display state, the polarization state of the light emerging from the first optical element OD1 and liquid crystal layer LQ has a smallest possible amplitude (Es) relative to an amplitude (Ep) in the major axis direction. The ellipticity of the polarized light was about 0.017. In addition, it was understood that the major axis direction of the substantially linearly polarized light is about 0° azimuth (X axis). From this, it is understood that in order to display a high quality black image, the absorption axis A2 of the second polarizer plate 52 should preferably be set at 0° azimuth.

EXAMPLE

Next, an Example of the liquid crystal display device according to the present embodiment is described. The liquid crystal display device is designed, for example, in the following manner.

In the liquid crystal display panel LPN, the liquid crystal layer LQ was composed of a liquid crystal composition including homogeneously aligned liquid crystal molecules. MJ041113 (manufactured by Merck, Δn=0.065) was applied as the liquid crystal composition. At this time, the director (major axis direction of liquid crystal molecules) of the liquid crystal molecules 40 is restricted by the rubbing direction of the alignment film 20 on the array substrate AR side, and was set at 45° to the X axis. The gap in the liquid crystal layer LQ was set at 4.9 μm. In order to realize black display, the voltage to be applied to the liquid crystal layer LQ was set at 4.8 (V), and the residual retardation of the liquid crystal layer LQ at this time was 60 (nm).

To begin with, in order to compensate the birefringence due to the liquid crystal molecules 40, the slow axis D1 of the first retardation plate RF1 of the first optical element OD1 (i.e. the alignment direction of liquid crystal molecules 61 of the first retardation plate RF1), which is to be disposed on the outer surface of the array substrate AR, is set in an azimuth direction (e.g. 225° azimuth) that is substantially opposite to the rubbing direction of the array substrate AR so as to establish a relationship of compensation. The frontal retardation of the first retardation plate RF1 was set at, e.g. 100 nm.

Subsequently, the slow axis D2 of the second retardation plate RF2 is set in an azimuth direction (e.g. 135° azimuth) that is substantially perpendicular to the liquid crystal molecules 40 and the slow axis D1 of the first retardation plate RF1. The frontal retardation of the second retardation plate RF2 was set at, e.g. 160 nm, which corresponds to the sum of the residual retardation of the liquid crystal layer LQ and the frontal retardation of the first retardation plate RF1.

Thereafter, the absorption axis A1 of the first polarizer plate 51 was set in an azimuth direction (e.g. 90° azimuth) crossing, at about 45°, the slow axis D1 of the first retardation plate RF1 and the slow axis D2 of the second retardation plate RF2.

On the other hand, the absorption axis A2 of the second polarizer plate 52 of the second optical element OD2, which is to be disposed on the outer surface of the counter-substrate CT, is set in an azimuth direction (e.g. 0° azimuth) that is substantially perpendicular to the absorption axis A1 of the first polarizer plate 51. As shown in FIG. 4B, the above-described azimuth direction of the slow axis of the retardation plate and the azimuth direction of the absorption axis of the polarizer plate are defined by the angles to the X axis.

The residual retardation R(LQ) of the liquid crystal layer LQ, the retardation R(RF1) of the first retardation plate RF1 and the retardation R(RF2) of the second retardation plate RF2 are not limited to the above-described values. If the values of the retardations satisfy the relationship of R(LQ)+R(RF1)=R(RF2), the same result is obtained in all cases.

An NH film (manufactured by Nippon Oil Corporation) having a mean inclination angle β of 37° was applied as the first retardation plate RF1. The mean inclination angle β, in this context, is defined as an angle of the depth-directional major refractive index nz to the normal direction. In a simplified manner, the mean inclination angle β is defined as a value given by [(high tilt angle+low tilt angle)/2+low tilt angle]. For example, as shown in FIG. 4A, the "high tilt angle" corresponds to the tilt angle (i.e. inclination to the major surface of the array substrate) of liquid crystal molecules 61A, which are included in the hybrid-aligned liquid crystal molecules and are raised at a greatest angle to the major surface of the array substrate AR. The "low tilt angle" corresponds to the tilt angle of liquid crystal molecules 61B which are included in the hybrid-aligned liquid crystal molecules and are raised at a smallest angle to the major surface of the array substrate AR. ZEONOR (manufactured by OPTES) was applied to the second retardation plate RF2.

Figure 6:
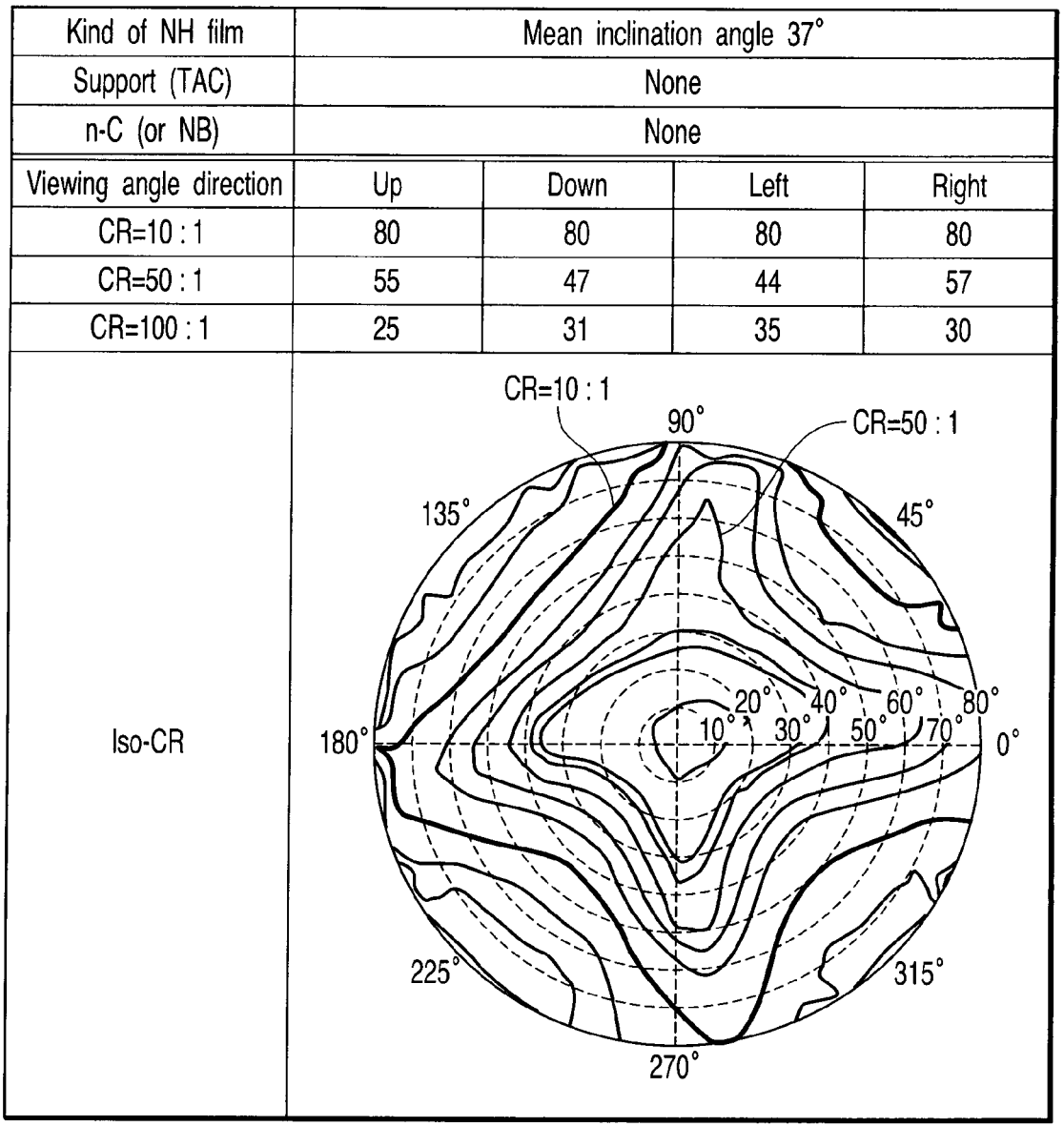
FIG. 6 is a characteristic diagram showing a measurement result of the viewing angle dependency of a contrast ratio in a liquid crystal display device relating to an Example of the present embodiment.

According to the present Example, a measurement result of the viewing angle dependency of the contrast ratio, as shown in FIG. 6, was obtained. In the Figure showing the measurement result relating to the viewing angle dependency of the contrast ratio, the center corresponds to the normal direction of the liquid crystal display panel LPN, and concentric circles about the normal direction correspond to 10° to 80° of tilt angles (viewing angles) to the normal direction. The characteristic diagram in FIG. 6 was obtained by connecting regions of isocontrast ratios in respective azimuth directions.

As shown in FIG. 6, according to this Example, it was confirmed that a sufficiently wide viewing angle of 160° with an isocontrast ratio (CR)=10:1, was obtained both in the up-and-down direction and right-and-left direction of the screen. The contrast in the normal direction of the screen was 400.

Figure 7A:
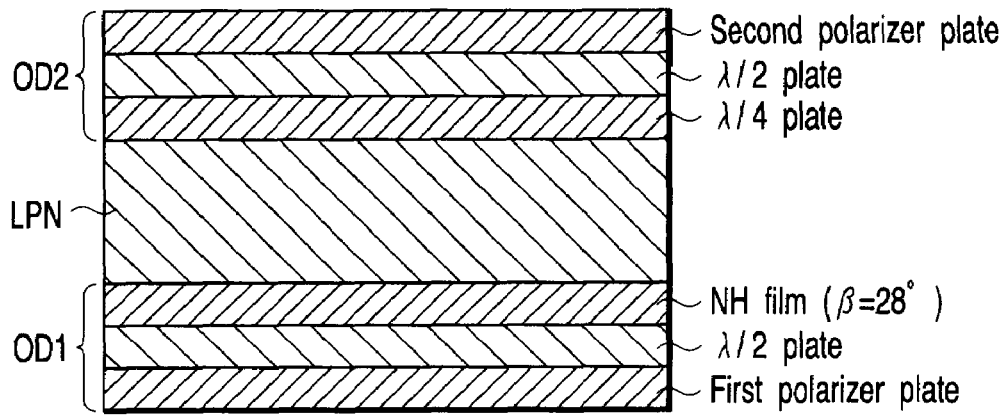
FIG. 7A schematically shows the structure of a liquid crystal display device according to Comparative Example 1.

On the other hand, FIG. 7A shows the structure of Comparative Example 1. The structure of the liquid crystal display panel LPN is the same as that of the Example. However, in Comparative Example 1, the first optical element OD1 comprises a first polarizer plate, a ½ wavelength plate and an NH film with a mean inclination angle β of 28°, and the second optical element OD2 comprises a second polarizer plate, a ½ wavelength plate and a ¼ wavelength plate.

Figure 7B:
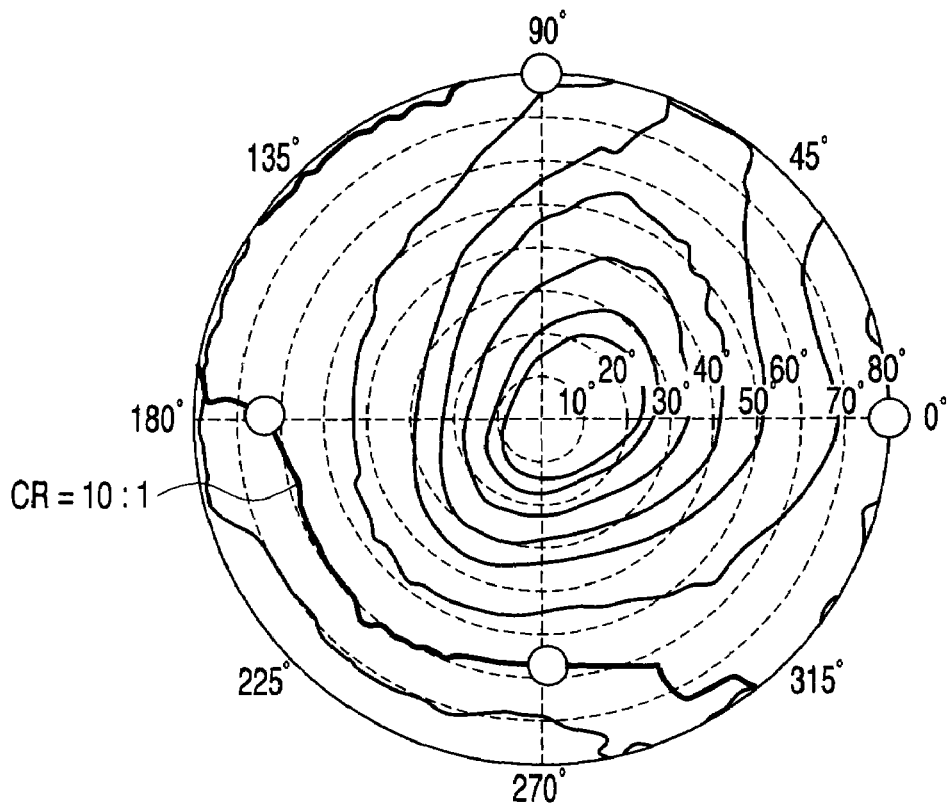
FIG. 7B is a characteristic diagram showing a measurement result of the viewing angle dependency of a contrast ratio in the liquid crystal display device according to Comparative Example 1.

FIG. 7B shows a measurement result of the viewing angle dependency of the contrast ratio in Comparative Example 1 having the structure shown in FIG. 7A. The viewing angle range with an isocontrast ratio (CR)=10:1 was 140/145° in the up-and-down direction/right-and-left direction of the screen, respectively. The contrast in the normal direction of the screen was 250. The measurement result of Comparative Example 1 was inferior to that of the Example.

According to the Example of the invention, improvements were confirmed with respect to both the contrast in the normal direction of the screen and the viewing angle range of the isocontrast ratio. As regards these measurements, the contrast in the normal direction of the screen was measured by BM5-A (manufactured by TOPCON) and the viewing angle characteristics were measured by Ez-Contrast (manufactured by ELDIM).

Figure 8:
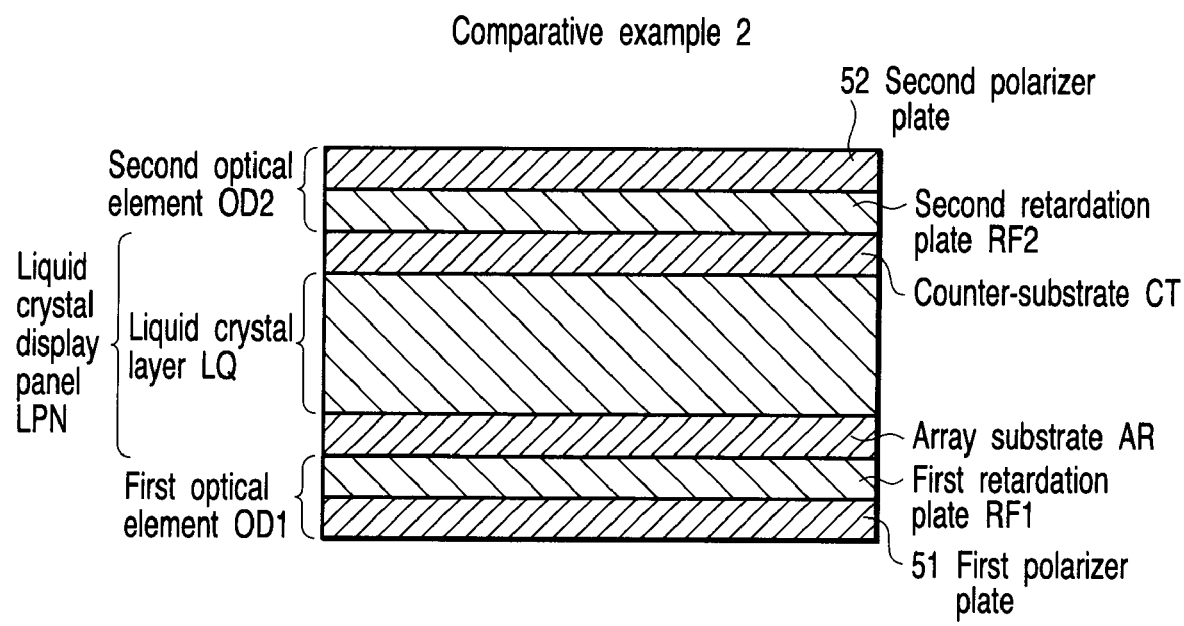
FIG. 8 schematically shows the structure of a liquid crystal display device according to Comparative Example 2.

Next, the difference between the present embodiment and Comparative Example 2 having a structure shown in FIG. 8, which is based on the same concept as the present embodiment, is clarified, and a description is given of the reason why good viewing angle characteristics are obtained in the embodiment.

The present embodiment differs from Comparative Example 2 shown in FIG. 8 only in that the second retardation plate RF2, which is included in the first optical element OD1 in the present embodiment, is included in the second optical element OD2 in Comparative Example 2. The present embodiment and Comparative Example 2 are the same with respect to the following respects: the liquid crystal layer LQ; the relationship between the axial angles of the first polarizer plate 51 and the first retardation plate RF1 in the first optical element OD1; the relationship between the axial angles between the first retardation plate RF1 and the director of liquid crystal molecules 40 included in the liquid crystal layer LQ; the frontal retardation R(RF1) of the first retardation plate RF1; and the mean inclination angle of the first retardation plate RF1. In addition, the present embodiment and Comparative Example 2 are the same with respect to the following respects: the angle of disposition of the absorption axis A2 of the second polarizer plate 52, which is included in the second optical element OD2, relative to the liquid crystal display panel LPN; the frontal retardation R(RF2) of the second retardation plate RF2 included in the second optical element OD2; and the relationship between the axial angles of the slow axis D2 of the second retardation plate RF2 and the slow axis D1 of the first retardation plate RF1. It is clear, therefore, that T-V characteristics (i.e. the relationship between the transmittance and the voltage applied to the liquid crystal layer LQ) in the frontal direction (i.e. the normal direction of the screen) are the same between the present embodiment and Comparative Example 2 shown in FIG. 2.

Figure 9A:
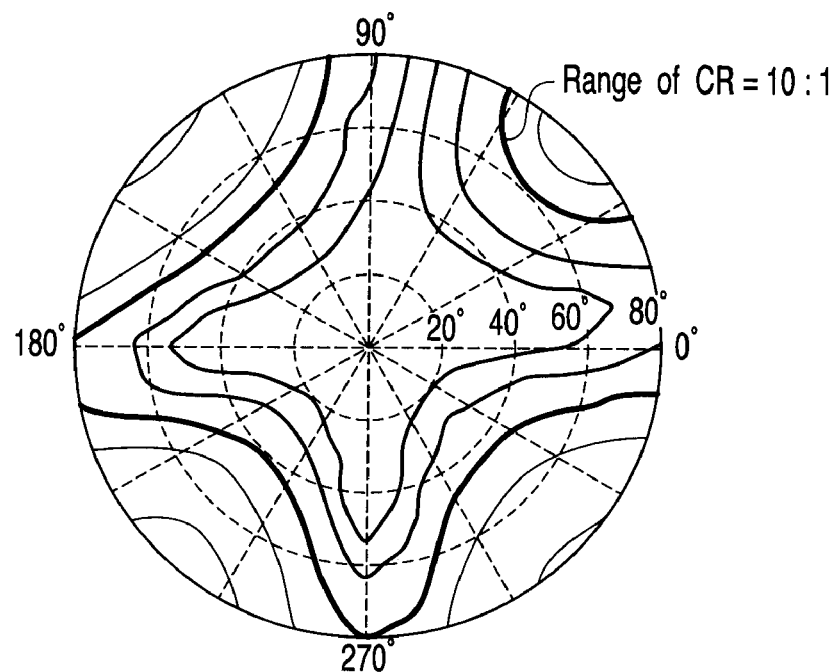
FIG. 9A is a characteristic diagram showing a simulation result of the viewing angle dependency of the contrast ratio in the liquid crystal display device relating to the Example of the present embodiment.
Figure 9B:
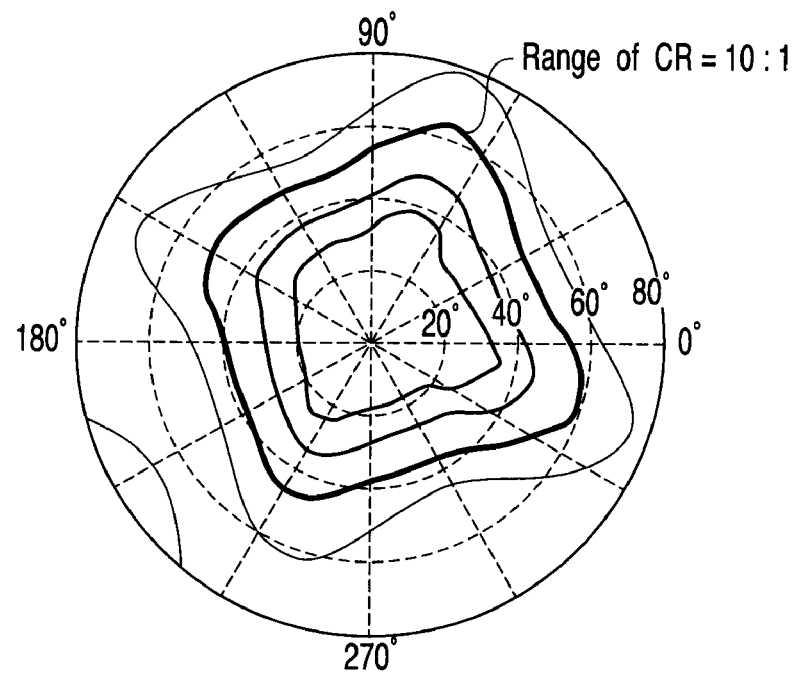
FIG. 9B is a characteristic diagram showing a simulation result of the viewing angle dependency of the contrast ratio in the liquid crystal display device according to Comparative Example 2.

FIG. 9A shows a simulation result of the viewing angle characteristics of the present embodiment, and FIG. 9B shows a simulation result of the viewing angle characteristics of Comparative Example 2. From these simulation results, it is understood that the embodiment and Comparative Example 2 have substantially the same characteristics in the frontal direction but are entirely different in the viewing angle characteristics, and that the present embodiment has good viewing angle characteristics but Comparative Example 2 has a narrower viewing angle.

In order to explain this result, an analysis was conducted, with respect to each structure, on the matching between the polarization state of backlight emerging from the first optical element OD1 and liquid crystal layer LQ and the polarization state of ambient light that has passed through the second optical element OD2.

Figure 10A:
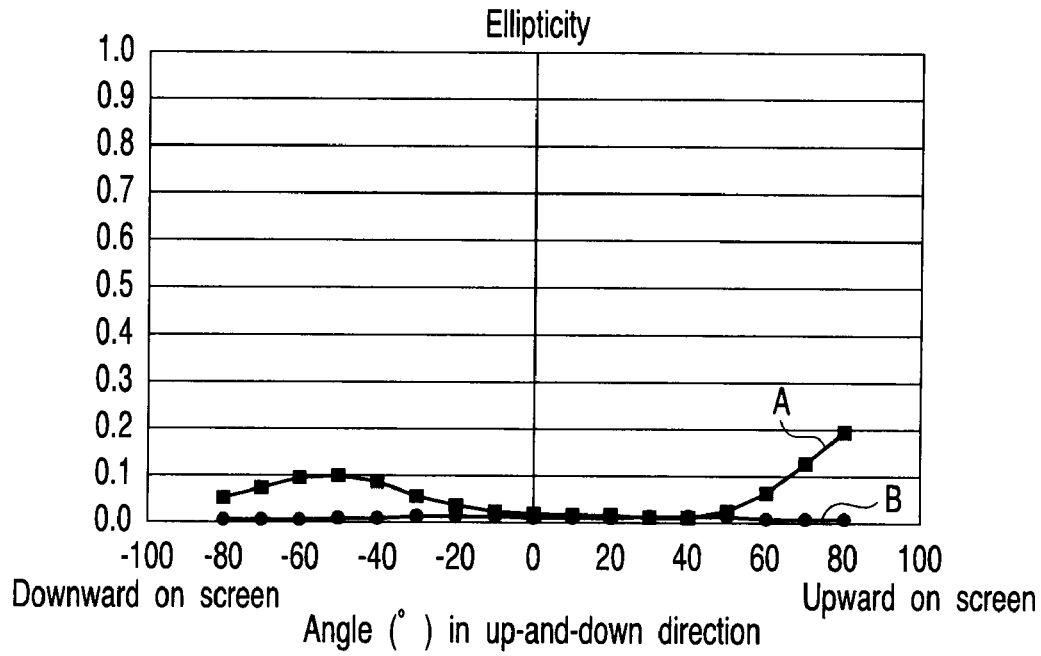
FIG. 10A is a characteristic diagram showing matching between a variation in ellipticity in an up-and-down direction of a polarization state of backlight, which has passed through the first optical element and the liquid crystal layer, and a variation in ellipticity in the up-and-down direction of a polarization state of ambient light, which has passed through the second optical element, in the Example of the present embodiment.
Figure 10B:
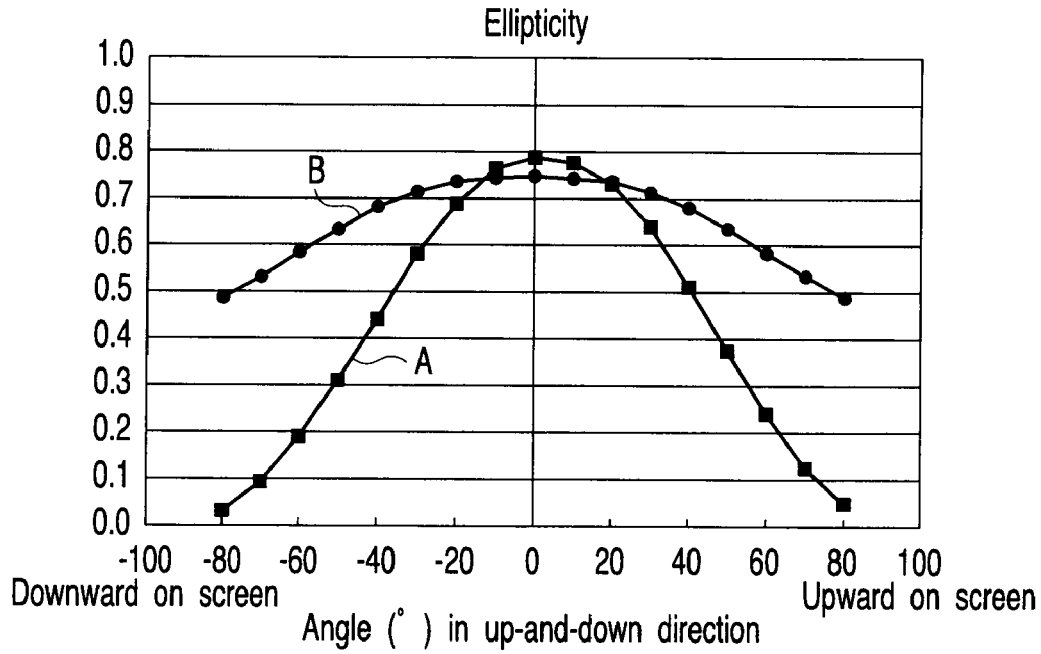
FIG. 10B is a characteristic diagram showing matching between a variation in ellipticity in an up-and-down direction of a polarization state of backlight, which has passed through the first optical element and the liquid crystal layer, and a variation in ellipticity in the up-and-down direction of a polarization state of ambient light, which has passed through the second optical element, in Comparative Example 2.

Assume now that a predetermined voltage (=4.8 V) for black display is applied to the liquid crystal layer LQ. FIG. 10A is a characteristic diagram showing matching between both polarization states in the up-and-down direction of the screen in the present embodiment, and FIG. 10B is a characteristic diagram showing matching between both polarization states in the up-and-down direction of the screen in Comparative Example 2. The abscissa indicates angles to the normal line in the up-and-down direction of the screen, and the ordinate indicates an ellipticity at a wavelength of 550 nm as a parameter indicating the polarization state. Symbol "A" in the Figures corresponds to the polarization state of backlight emerging from the first optical element OD1 and liquid crystal layer LQ, and symbol "B" corresponds to the polarization state of ambient light which has passed through the second optical element OD2.

The azimuth direction of the liquid crystal molecules in the liquid crystal layer LQ is set at 45°. Thus, although FIG. 10A and FIG. 10B show the viewing angle characteristics in the up-and-down direction of the screen, the same viewing angle characteristics are exhibited in the right-and-left direction of the screen. In order to realize good viewing angle compensation, it is important that the polarization state of backlight emerging from the first optical element OD1 and liquid crystal layer LQ substantially agrees with the polarization state of ambient light that has passed through the second optical element OD2.

As is clear from FIG. 10A, both polarization states substantially agree in the present embodiment. However, as shown in FIG. 10B, in Comparative Example 2, both polarization states become greatly different as the viewing angle increases. In addition, it is understood that the frontal polarization state in Comparative Example 2 is an elliptic polarization with an ellipticity>0.7, whereas the frontal polarization state in the present embodiment is close to a substantially linear polarization with an ellipticity<0.1. In short, the present embodiment differs from Comparative Example 2 in that linear polarization (or elliptic polarization with a relatively small ellipticity) is mainly used in the present embodiment whereas circular polarization (or elliptic polarization with a relatively large ellipticity) is mainly used in Comparative Example 2.

In the case where elliptic polarization with a relatively large ellipticity in the normal direction of the screen is applied as in Comparative Example 2, good display quality is, in usual cases, not obtained unless a third retardation plate RF3 (negative C-plate; n-C) having a relationship of nx=ny>nz between major refractive indices nx, ny and nz is additionally provided in the second optical element OD2, or a negative biaxial film (NB) having a relationship of nx>ny<nz is applied as the second retardation plate RF2.

FIG. 11A shows viewing angle characteristics in a case where a negative C-plate (manufactured by Nitto Denko) is disposed as a third retardation plate between the second optical element OD2 and the liquid crystal layer LQ in the structure of Comparative Example 2. In the negative C-plate, the retardation (Rth), which is defined by "Rth=[(nx−ny)/2−nz]× film thickness", was set at 80 nm.

FIG. 11B shows matching between the polarization state of backlight emerging from the first optical element OD1 and liquid crystal layer LQ and the polarization state of ambient light that has passed through the second optical element OD2 in the structure in which the negative C-plate (Rth=80 nm) is disposed between the second optical element OD2 and the liquid crystal layer LQ. The matching between both polarization states is good, and also good viewing angle characteristics can be obtained.

On the other hand, in the present embodiment, the polarization state of backlight emerging from the first optical element OD1 and liquid crystal layer LQ can be converted to an elliptic polarization state that is close to a substantially linear polarization with an ellipticity<0.1 in the frontal direction of the screen. Thus, the viewing angle compensation can be made by the second polarizer plate 52 alone, even without applying a negative C-plate (n-C) or a negative biaxial film (NB) to the second optical element OD2. Therefore, it is possible to provide a liquid crystal display device with good display quality, which can realize reduction in thickness and cost.

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

For example, in the above-described embodiment, each of the switching elements W is composed of an n-channel thin-film transistor. However, if various driving signals of similar kinds can be generated, other structures may be adopted.

Figure 12A:
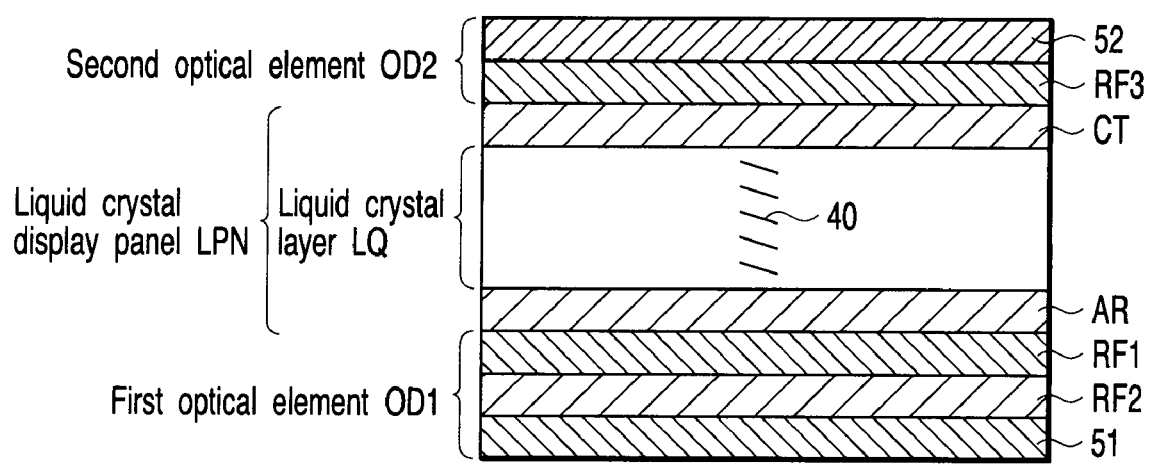
FIG. 12A schematically shows the structure of a liquid crystal display device according to a modification of the present embodiment, wherein a second optical element, which is configured such that a third retardation plate (negative C-plate) is disposed between the second polarizer plate and the liquid crystal layer, is applied.

The second optical element OD2 may include a third retardation plate corresponding to a negative C-plate between the second polarizer plate 52 and the liquid crystal display panel LPN. Specifically, as shown in FIG. 12A, in a liquid crystal display device according to a modification of the invention, the second optical element OD2 is composed of a second polarizer plate 52 and a third retardation plate RF3 that is disposed between the second polarizer plate 52 and the liquid crystal display panel LPN.

The third retardation plate RF3 has a refractive index anisotropy which is defined by the relationship of nx=ny>nz, where nx and ny are refractive indices in mutually perpendicular directions in the plane of the third retardation plate RF3, and nz is a refractive index in the normal direction of the third retardation plate RF3. In the third retardation plate RF3, the retardation Rth in the normal direction was set at 80 nm.

Figure 12B:
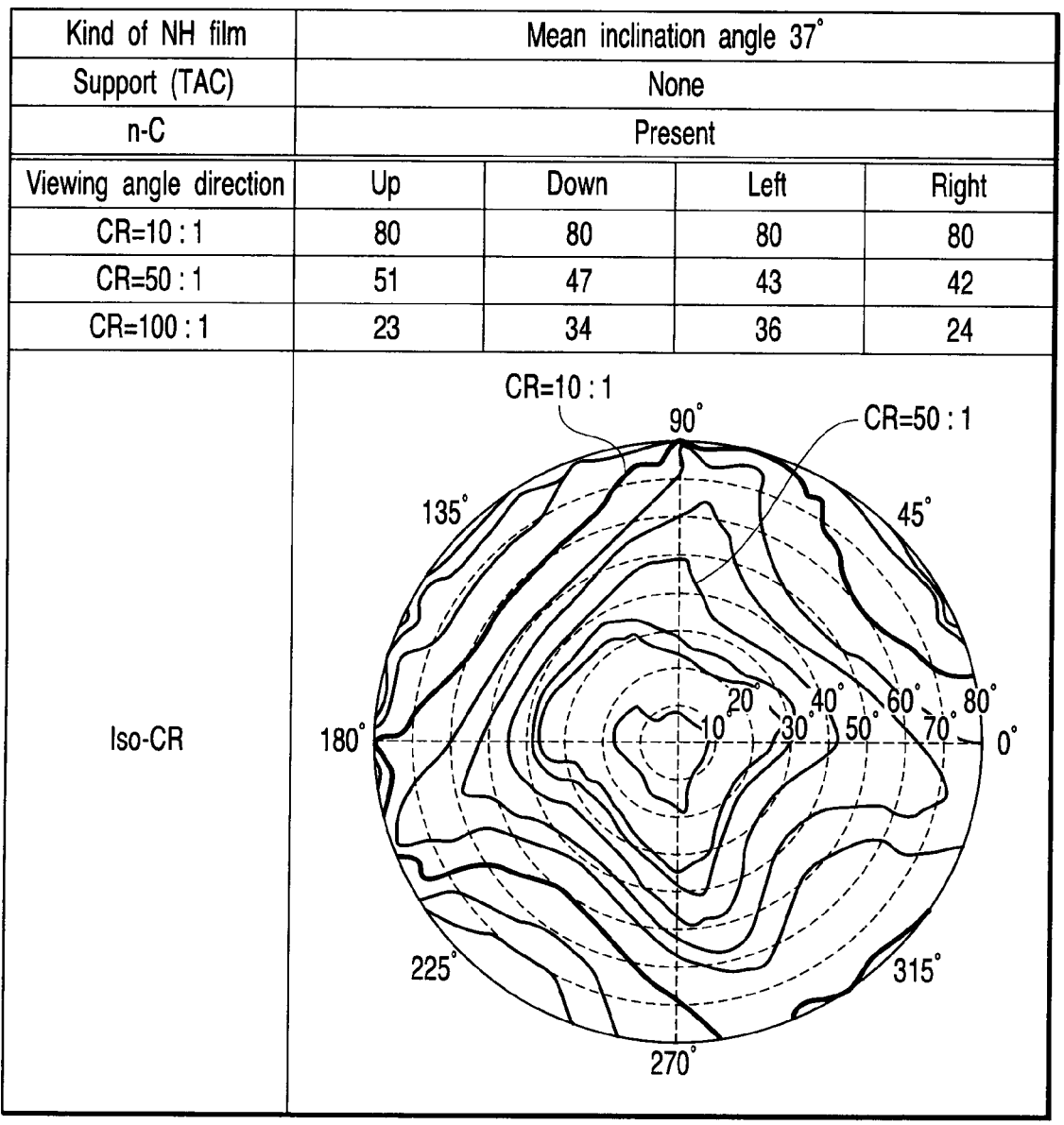
FIG. 12B is a characteristic diagram showing a measurement result of the viewing angle dependency of the contrast ratio in the modification shown in FIG. 12A.

According to the modification with this structure, as shown in FIG. 12B, it is understood that, compared to the measurement result (shown in FIG. 6) of the viewing angle dependency of the contrast ratio in the structure of the embodiment (shown in FIG. 3) in which the third retardation plate RF3 is not provided, an approximately equal viewing angle was obtained in the region with a low contrast ratio (e.g. CR=10:1). It is understood, however, that in the structure of the embodiment in which the third retardation plate RF3 is not provided, a wider viewing angle is obtained in the region with a high contrast ratio (e.g. CR=50:1). Although not shown, similar characteristics, as shown in FIG. 12B, can be obtained even in the case the negative biaxial film (NB) is applied as the third retardation plate RF3.

Based on the above result, it was confirmed that, in particular, in order to increase the region of a high contrast ratio, the structure of the embodiment (i.e. the structure in which the second optical element includes neither the negative C-plate nor the negative biaxial film) is more advantageous than the structure in which the second optical element includes the third retardation plate that is composed of the negative C-plate or the negative biaxial film.

Figure 13:
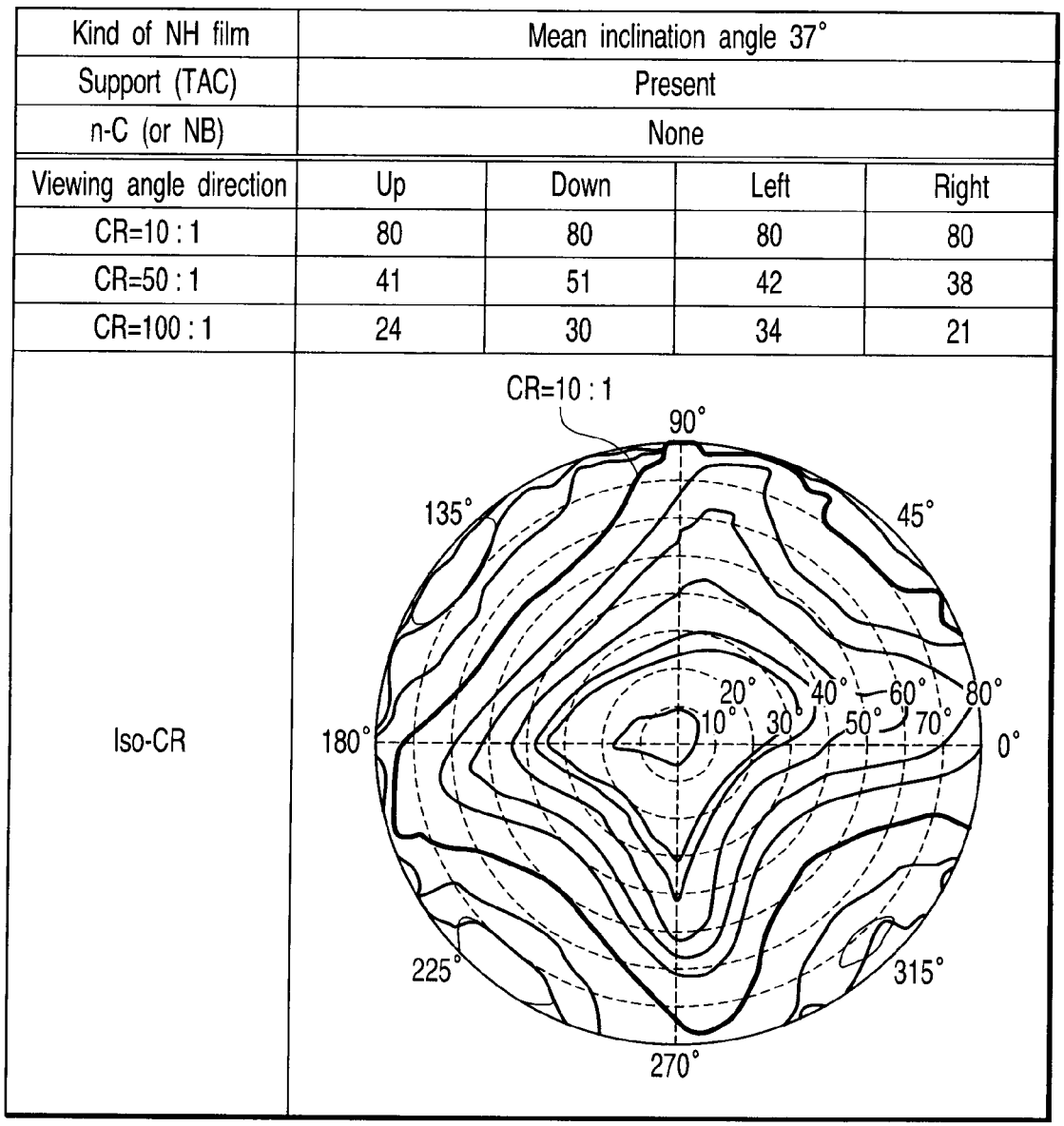
FIG. 13 is a characteristic diagram showing a measurement result of the viewing angle dependency of the contrast ratio in the present embodiment, wherein an NH film including a base film is used as the first retardation plate.

In the above-described embodiment, it is desirable that the first retardation plate RF1 be composed of the liquid crystal film layer 60 alone. Specifically, in the embodiment, the first retardation plate RF1 is composed of the liquid crystal film layer 60 that is in contact with the second retardation plate RF2 and the outer surface of the liquid crystal display panel LPN (i.e. the outer surface of the insulating substrate 10 that constitutes the array substrate AR). The retardation plate having the liquid crystal film layer including hybrid-aligned liquid crystal molecules, such as the NH film, is obtained by performing alignment treatment on a base film, coating a liquid crystal material on the base film, and solidifying the liquid crystal material in the state in which liquid crystal molecules maintain a predetermined alignment state. Triacetate cellulose (TAC) is widely used as the base film. However, the base film itself has a retardation. In order to realize good optical compensation, it is necessary to perform compensation by taking the retardation of the base film into account. Thus, by applying a base-film-less NH film as in the above-described Example, the optical compensation can easily be realized. For the purpose of reference, FIG. 13 shows a measurement result, which was obtained by measuring the viewing angle dependency of the contrast ratio in the case where the NH film with the base film was applied as the first retardation plate RF1 in the same structure as in the Example.

It is understood that a viewing angle, which is approximately equal to the viewing angle in the base-film-less structure of the Example shown in FIG. 6, was obtained in the region with a low contrast ratio (e.g. CR=10:1). It is understood, however, that in the base-film-less structure of the Example, a wider viewing angle is obtained in the region with a high contrast ratio (e.g. CR=50:1). Based on the above result, it was confirmed that, in particular, in order to increase the region of a high contrast ratio, the structure of the Example (i.e. the structure in which the first retardation plate RF1 without the base film (without TAC) is applied) is more advantageous than the structure in which the first retardation plate RF1 with the base film (TAC) is applied.

Figure 14:
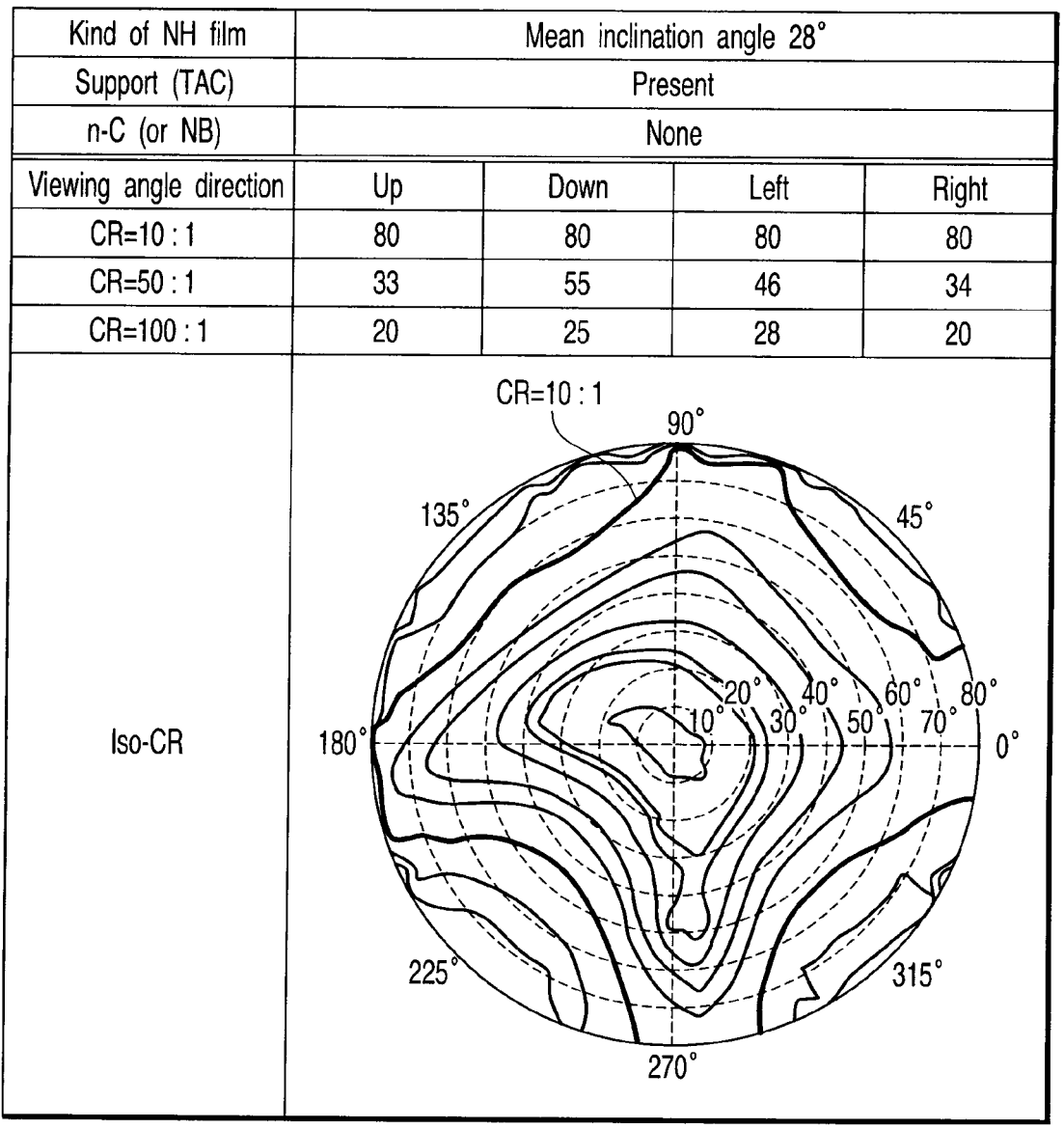
FIG. 14 is a characteristic diagram showing a measurement result of the viewing angle dependency of the contrast ratio in the present embodiment, wherein an NH film with a mean inclination angle of 28° is used as the first retardation plate.

In the above-described embodiment, it is desirable to use the first retardation plate RF1 having the liquid crystal film layer 60 with a relatively large mean inclination angle $\beta$, e.g. $\beta=37°$ or thereabout. For the purpose of reference, FIG. 14 shows a measurement result, which was obtained by measuring the viewing angle dependency of the contrast ratio in the case where the first retardation film (NH film) with the liquid crystal film having $\beta=28°$ was applied in the same structure as in the Example.

It is understood that a viewing angle, which is approximately equal to the viewing angle in the structure with $\beta=37°$ of the Example shown in FIG. 6, was obtained in the region with a low contrast ratio (e.g. CR=10:1). It is understood, however, that in the structure with $\beta=37°$ of the Example, a wider viewing angle is obtained in the region with a high contrast ratio (e.g. CR=50:1). Based on the above result, it was confirmed that, in particular, in order to increase the region of a high contrast ratio, the structure of the Example (i.e. the structure in which the first retardation plate RF1 having the liquid crystal film with a large mean inclination angle is applied) is more advantageous than the structure in which the first retardation plate RF1 having the liquid crystal film with a small mean inclination angle is applied.

What is claimed is:

1. A liquid crystal display device, comprising:
a liquid crystal display panel in which a liquid crystal layer including homogeneously aligned liquid crystal molecules is held between a first substrate and a second substrate which are disposed to be opposed to each other;
a first optical element which is provided on one of outer surfaces of the liquid crystal display panel and includes a first polarizer plate, and a first retardation plate and a second retardation plate which are disposed between the first polarizer plate and the liquid crystal display panel, and in the first optical element, an angle between an absorption axis of the first polarizer plate and a slow axis of the second retardation plate is set at about 45°, a slow axis of the first retardation plate and a director of the liquid crystal molecules included in the liquid crystal layer are set to be substantially parallel, and an angle between the slow axis of the first retardation plate and the slow axis of the second retardation plate is set at about 90°; and
a second optical element which includes a second polarizer plate provided on an other outer surface of the liquid crystal display panel, and in the second optical element, an angle between an absorption axis of the second polarizer plate and the absorption axis of the first polarizer plate is set at about 90°,
wherein the first retardation plate includes a liquid crystal film layer which imparts a predetermined retardation to light of a predetermined wavelength and in the first retardation plate nematic liquid crystal molecules are solidified in a state in which the nematic liquid crystal molecules are hybrid-aligned along a normal direction.

2. The liquid crystal display device according to claim 1, wherein the first optical element controls a polarization state of light, which passes through the first optical element, in a manner that light having a polarization state of substantially linear polarization enters the liquid crystal layer.

3. The liquid crystal display device according to claim 1, wherein the first retardation plate is composed of the liquid crystal film layer which is in contact with the second retardation plate and the one outer surface of the liquid crystal display panel.

4. The liquid crystal display device according to claim 1, wherein a sum of a residual retardation of the liquid crystal layer and a frontal retardation of the first retardation plate is substantially equal to a frontal retardation of the second retardation plate.

5. The liquid crystal display device according to claim 1, wherein the second optical element includes a third retardation plate between the second polarizer plate and the liquid crystal display panel, and the third retardation plate has a refractive index anisotropy, which is defined by a relationship of $nx = ny > nz$, where $nx$ and $ny$ are refractive indices in mutually perpendicular directions in a plane of the third retardation plate, and $nz$ is a refractive index in a normal direction of the third retardation plate.

6. The liquid crystal display device according to claim 1, further comprising: a backlight unit which illuminates the liquid crystal display panel from the first optical element side.

* * * * *